United States Patent
Craane et al.

(10) Patent No.: US 12,005,765 B2
(45) Date of Patent: Jun. 11, 2024

(54) OPEN ROOF ASSEMBLY FOR USE IN A VEHICLE AND A METHOD FOR OPERATING SAME

(71) Applicant: Inalfa Roof Systems Group B.V., Oostrum (NL)

(72) Inventors: Dennie Wilhelmus Hendrikus Craane, Nijmegen (NL); Marco Van Mourik, Ravenstein (NL)

(73) Assignee: INALFA ROOF SYSTEMS GROUP B.V., Oostrum (NL)

(*) Notice: Subject to any disclaimer, the term of this patent is extended or adjusted under 35 U.S.C. 154(b) by 749 days.

(21) Appl. No.: 17/122,750

(22) Filed: Dec. 15, 2020

(65) Prior Publication Data

US 2021/0178871 A1 Jun. 17, 2021

(30) Foreign Application Priority Data

Dec. 17, 2019 (EP) .................................... 19216990

(51) Int. Cl.
   *B60J 7/043* (2006.01)
   *B60J 7/057* (2006.01)
   (Continued)

(52) U.S. Cl.
   CPC ............ *B60J 7/043* (2013.01); *B60J 7/0573* (2013.01); *E05F 15/41* (2015.01); *E05F 15/662* (2015.01);
   (Continued)

(58) Field of Classification Search
   CPC ........ B60J 7/0573; B60J 7/043; E05F 15/659; E05F 15/40; G05B 13/04
   See application file for complete search history.

(56) References Cited

U.S. PATENT DOCUMENTS

| 6,630,808 B1 | 10/2003 | Kliffken et al. |
| 8,418,814 B1 * | 4/2013 | Byers ..................... B66B 9/00 312/247 |

(Continued)

FOREIGN PATENT DOCUMENTS

| CN | 102393867 A | 3/2012 |
| CN | 109962655 A1 | 7/2019 |

(Continued)

OTHER PUBLICATIONS

European Search Report for European Patent Application No. 19216990.2, dated Jul. 23, 2020.

(Continued)

*Primary Examiner* — Dalena Tran
(74) *Attorney, Agent, or Firm* — Steven M. Koehler; Westman, Champlin & Koehler, P.A.

(57) ABSTRACT

An open roof assembly for use in a vehicle roof comprises a moveably arranged closure member and a drive system operatively coupled to the closure member for moving the closure member along a motion trajectory. The drive system comprises an electric motor and a control unit for controlling operation of the electric motor. The control unit comprises a mathematical model describing at least a part of the drive system; model parameters and a motion reference field. The control unit is configured to update the model parameters based on a received value of a first drive system variable; determine a value of a second drive system variable using the mathematical model; determine a comparison value by comparing the value of the second drive system value and a corresponding reference value of the motion reference field; and detect presence of an obstruction if the comparison value lies outside a predetermined value range.

16 Claims, 5 Drawing Sheets

(51) Int. Cl.
  E05F 15/41    (2015.01)
  E05F 15/662   (2015.01)
  G06N 7/00     (2023.01)
  E05F 15/659   (2015.01)

(52) U.S. Cl.
  CPC .............. *G06N 7/00* (2013.01); *E05F 15/659* (2015.01); *E05Y 2400/33* (2013.01); *E05Y 2900/542* (2013.01)

(56) References Cited

U.S. PATENT DOCUMENTS

| | | | |
|---|---|---|---|
| 2003/0051555 | A1 | 3/2003 | Fukumura et al. |
| 2018/0298668 | A1* | 10/2018 | Novello ................. H02P 7/04 |
| 2019/0199258 | A1 | 6/2019 | Craane |
| 2019/0390500 | A1* | 12/2019 | Pellegrinetti ......... H02P 7/0094 |
| 2020/0295678 | A1* | 9/2020 | Thomann ............... H02P 6/007 |

FOREIGN PATENT DOCUMENTS

| | | |
|---|---|---|
| EP | 3503333 A1 | 6/2019 |
| EP | 3503333 B1 | 9/2020 |
| JP | 2019125362 A | 7/2019 |

OTHER PUBLICATIONS

Yingjie Zhang et al., "Study on Electric Sunroof Detection of Cars Based on Model Reference Adaptive Cholesky Decomposition Filter", published in IEEE Transactions on Transportation Electrification issue 99, Sep. 21, 2017.

Ata Sevinc, "A Full Adaptive Observer for DC Servo Motors", published in Turk J Elec Engin, vol. 11, No. 2, 2003.

M. Ruderman et al., "Optimal State Space Control of DC Motor", Proceedings of the 17th World Congress of the International Federation of Automatic Control, vol. 17, No. 1, pp. 5796-5801, 2008.

Min Pak et al. "Acurate Pinch Detection Using Recent Finite Measurements for Automotive Anti-pinch Sunroof Systems", International Journal of Control, Automation and Systems, 2017, pp. 2443-2447, vol. 15, No. 5.

Office Action in corresponding European patent application No. 19216990.2 dated Oct. 23, 2023.

Ra et al. "Practical Pinch Detection Algorithm for Smart Automotive Power Window Control Systems", IEEE Transactions on Industrial Electronics, Mar. 2008, pp. 1376-1384, vol. 55, No. 3.

\* cited by examiner

OPEN ROOF ASSEMBLY FOR USE IN A VEHICLE AND A METHOD FOR OPERATING SAME

BACKGROUND

The discussion below is merely provided for general background information and is not intended to be used as an aid in determining the scope of the claimed subject matter.

Aspects of the invention relate to an open roof assembly for use in a vehicle roof of a vehicle.

An open roof assembly for use in a vehicle roof of a vehicle is known. In particular, a known open roof assembly comprises a moveably arranged closure member for selectively covering or at least partially exposing an opening in the vehicle roof. Further, a drive system is provided and operatively coupled to the closure member for moving the closure member along a motion trajectory. The drive system comprises an electric motor and a control unit operatively coupled to the electric motor for controlling operation of the electric motor. The control unit is thus provided and configured for controlling a position and motion of the closure member.

The control unit of the known open roof assembly is further configured to detect the presence of an obstruction. In particular a pinch with an object or an entrapment of an object is preferably detected as soon as possible, e.g. in order to regulatory standards like European ECE standard or US FMVSS-118. Thereto, it is known to perform a calibration by determining a motion reference field. The motion reference field describes a reference value of at least one certain drive system variable as a function of a position of the closure member along its motion trajectory. So, for example, in a calibration run, the closure member is moved from e.g. its open position to its closed position and a torque generated by the electric motor is determined for a number of positions along the motion trajectory from the open position to the closed position. The determined torque values may be stored as the motion reference field. Then, in operational use, the generated torque is determined and compared to the corresponding reference value, i.e. the reference value at the corresponding position. If the generated torque deviates too much from the reference value, a pinch or entrapment may be detected. It is noted that any other suitable drive system variable may be used instead of the torque.

In order to determine the generated torque or other drive system variable as a second drive system variable, a value of a measurable drive system variable may be received by the control unit as a first drive system variable and be used in a calculation. In particular, a mathematical model may be employed to obtain the value of the second drive system variable using the first drive system variable.

In practice, however, the calculated value of the second drive system variable may deviate from the reference value even without an obstruction present to such an extent that a relatively large value range around the reference value is provided as a threshold to prevent erroneous detection of presence of an obstruction. On the other hand, a large value range reduces the sensitivity for obstruction detection and therefore a small value range would be preferred.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, the object is achieved in an open roof assembly for use in a vehicle roof of a vehicle according to claim 1. In particular, the open roof assembly comprises a moveably arranged closure member for selectively covering or at least partially exposing an opening in the vehicle roof and a drive system operatively coupled to the closure member for moving the closure member along a motion trajectory. The drive system comprises an electric motor and a control unit operatively coupled to the electric motor for controlling operation of the electric motor and for receiving a first drive system variable. The control unit comprises a mathematical model describing at least a part of the drive system; model parameters as used in the mathematical model; and a motion reference field describing a reference value of a second drive system variable as a function of a position of the closure member along its motion trajectory. Further, the control unit is configured to update the model parameters based on a received value of the first drive system variable; determine a value of the second drive system variable using the mathematical model; determine a comparison value by comparing the value of the second drive system value and a corresponding reference value of the motion reference field; and detect presence of an obstruction if the comparison value lies outside a predetermined value range.

The practical deviation of the calculated second drive system variable is at least partially due to a production spread in parts of the open roof assembly and in the mounting of the parts in the open roof assembly. Consequently, the mathematical model, employing model parameters describing at least a part of the drive system, is not accurate for each open roof assembly that is manufactured. Even if the mathematical model fits the particular drive system during manufacturing, in practical circumstances under influence of e.g. temperature, driving conditions, ageing, etc., the mathematical model will not fit the drive system under all conditions or may start to deviate over time. Therefore, the mathematical model is continuously calibrated during normal operation. Based on the received first drive system variable, the model parameters of the mathematical model may be updated. Thus, the mathematical model is continuously adapted to the actual conditions and associated effects on the motion and operation of the open roof assembly. As a consequence, the determined value of the second drive system variable is more accurate and corresponds better to the reference value. This allows to reduce a detection threshold, defined by the value range, and sensitivity is accordingly increased without increasing the chance of a false detection. Moreover, due to the increased sensitivity, a pinch may be detected sooner and a maximum pinching force may be reduced.

In an embodiment, the steps of updating, determining the second drive system variable, determining the comparison value and detecting the presence of an obstruction are repeated as long as the closure member is moving and no obstruction is detected. So, during motion of the closure member, the control unit repeatedly updates the model parameters and continuous to do so, until either the motion of the closure member is stopped because the closure member has arrived at its destined position or a pinch is detected.

In an embodiment, the step of updating the model parameters is performed prior to the step of determining the value of the second drive system variable. In another embodiment, the step of determining the value of the second drive system variable is performed prior to the step of updating the model parameters. In yet another embodiment, the step of updating the model parameters and the step of determining the value of the second drive system variable are performed simultaneously. The order of these steps may be selected based on requirements, for example. If the model parameters are updated first, the determination of the value of the second drive system variable may be performed using the updated model parameters, wherein in case of a pinch the model parameters may be slightly affected by the pinch. On the other hand, if the value of the second drive system variable is determined first, the model parameters used in the mathematical model may be slightly affected due to the delay between the moment of establishing the value of the first drive system variable and the application of the model parameters derived therefrom. In either case, the effect may be considered and expected to be insignificant and both embodiments may function correctly. In the embodiment, wherein both steps are performed simultaneously, some calculation time may be spared, but additional computational power may be required.

In an embodiment, the control unit is configured to reverse a direction of motion of the closure member, when an obstruction is detected. In order to ensure that an object does not stay trapped, the closure member may be moved in the reverse direction when a pinch has been detected. Such a reversal may be required by law and may include a reversal over a predetermined short distance or may include a reversal over a longer distance, e.g. to a fully open position.

In an embodiment, the mathematical model comprises a model of the electric motor. For example, a suitable mathematical motor model is described in EP3503333A1, in particular in the description from paragraph [0051] to paragraph [0067], which paragraphs and related drawings, FIGS. 9-13, are hereby incorporated by reference. Based on the motor model parameters determined, a motor torque and/or a load torque may be derived, for example.

In an embodiment, the mathematical model comprises a model of a motion of the closure member. For example, a Newtonian equation of motion may be used to provide for a suitable model. In particular, in U.S. Pat. No. 6,630,808 such a model is described. The model described in U.S. Pat. No. 6,630,808, which is incorporated herein by reference in its entirety, provides for a value of a spring stiffness and a damping factor. In particular the second method variant as described therein is suitable for use in the present invention. However, instead of using the residues (as described in relation to FIG. 2), the values of the stiffness and the damping factor in the Newtonian equation of motion are usable. With the values of the stiffness and the damping, the actual, local force is derivable as the second drive system variable and may be compared to a reference value of the force. So, in this embodiment of the present invention, a force derived from such spring stiffness and damping factor may be used to obtain the second drive system variable, for example.

In the first drive system variable is selected from a group comprising a motor supply voltage, a motor current and a motor speed. Values for these variables may be relatively easily derivable without expensive sensors or complex constructions.

In an embodiment, the second drive system variable is selected from a group comprising a motor current, a closure member position, a generated force, a generated torque, a stiffness and a damping factor or any derivative with respect to time thereof.

In an embodiment, the control unit is further configured to determine a presence of an obstruction based on a time-derivative of an output of the mathematical model. In this embodiment, the output of the mathematical model is additionally used for a detection of a pinch without comparison with the motion reference field. Such detection methods are described in the above-mentioned patent publications EP3503333 and U.S. Pat. No. 6,630,808. Such a method of pinch detection may have sensitivity to different objects or circumstances compared to the method using the motion reference field. Therefore, the methods may complement each other. More in particular, the methods described in the above-mentioned patent applications determine the presence of an obstruction based on a sudden change in a value of a variable, whereas the method using a threshold determines the presence of an obstruction based on an absolute value. Slowly increasing variables may escape the above prior art methods, whereas a method based on an absolute value may have a delay between first pinch contact and actual pinch detection.

In an aspect, the present invention further provides a method of operating an open roof assembly. The open roof assembly comprises a moveably arranged closure member for selectively covering or at least partially exposing an opening in the vehicle roof and a drive system operatively coupled to the closure member for moving the closure member along a motion trajectory. The drive system comprises an electric motor and a control unit operatively coupled to the electric motor for controlling operation of the electric motor and for receiving at least one first drive system variable. The control unit comprises a mathematical model describing at least a part of the drive system; model parameters as used in the mathematical model; and a motion reference field describing a reference value of a second drive system variable as a function of a position of the closure member along its motion trajectory. The method comprising the control unit performing the steps of updating the model parameters based on the received at least one first drive system variable; determining a value of the second drive system variable using the mathematical model; determine a comparison value by comparing the value of the second drive system value and a corresponding reference value of the motion reference field; and detect presence of an obstruction if the comparison value lies outside a predetermined value range.

In an embodiment of the method, the steps of updating the model parameters, determining the value of the second drive system variable, determining the comparison value and detecting presence of an obstruction are repeated as long as the closure member is moving and no obstruction is detected.

In an embodiment, the method further comprises the control unit performing the step of reversing a direction of motion of the closure member, when an obstruction is detected.

In a further aspect, the present invention provides a computer software product comprising computer readable and executable instructions for instructing a computer processor to perform the method steps. In particular, such computer processor may be comprised in a control unit of an open roof assembly.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1A:
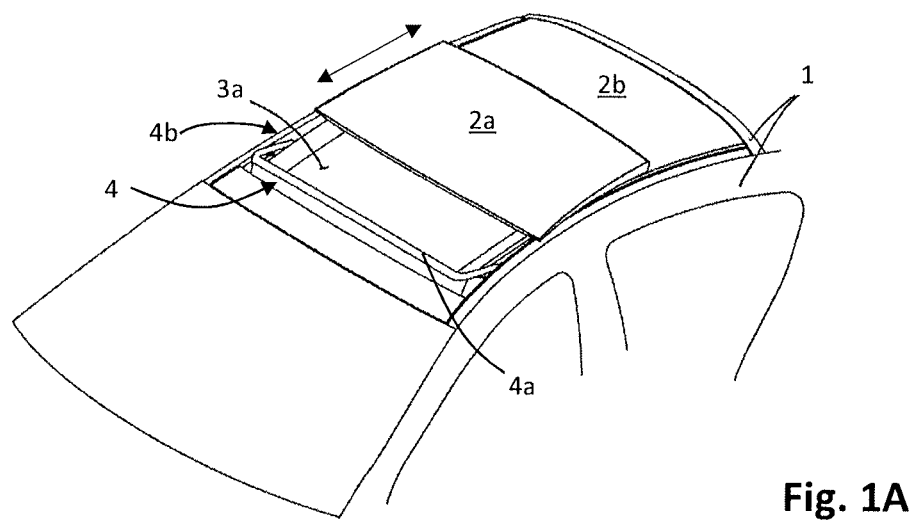
FIG. 1A shows a perspective view of a vehicle roof with an open roof assembly.

Aspects of the present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
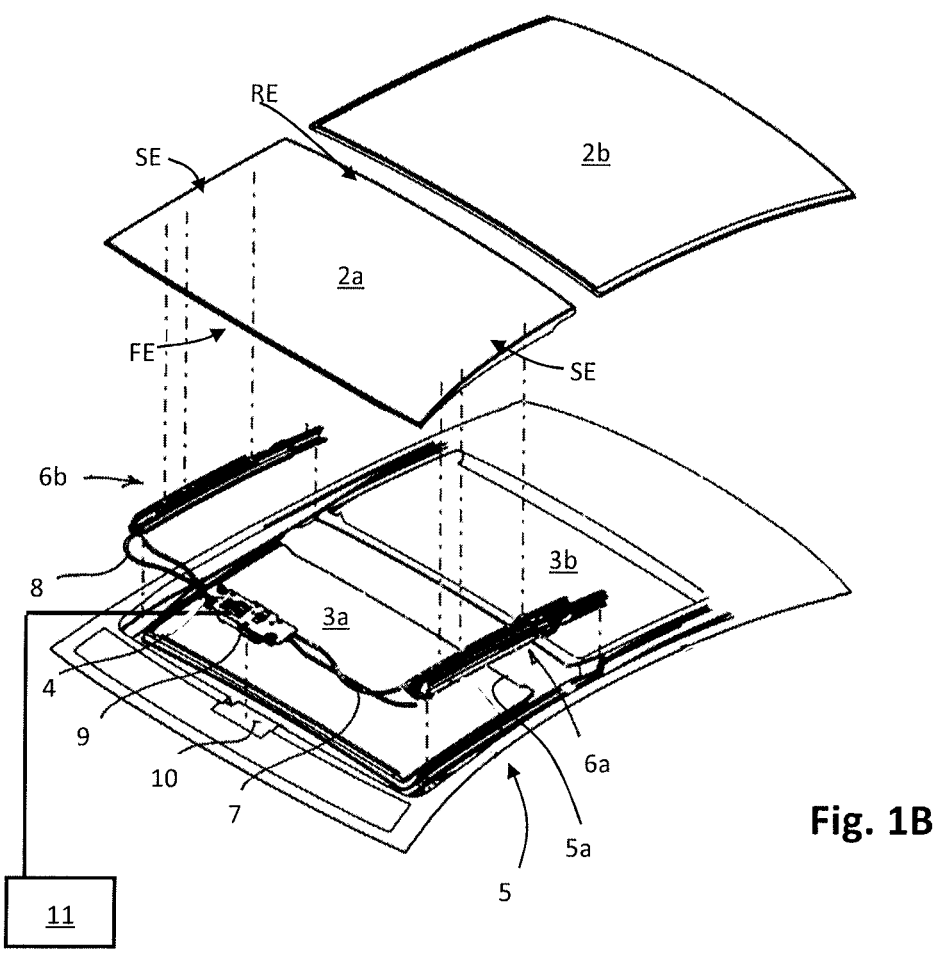
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end (FE) of the moveable panel 2a at a recess 10. In another embodiment, the electric motor 9 may be positioned at any other suitable position or location. For example, the electric motor 9 may be arranged near or below the rear end (RE) of the moveable panel 2a or below the fixed panel 2b.

A control unit 11 is schematically illustrated and is operatively coupled to the electric motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figure 2:
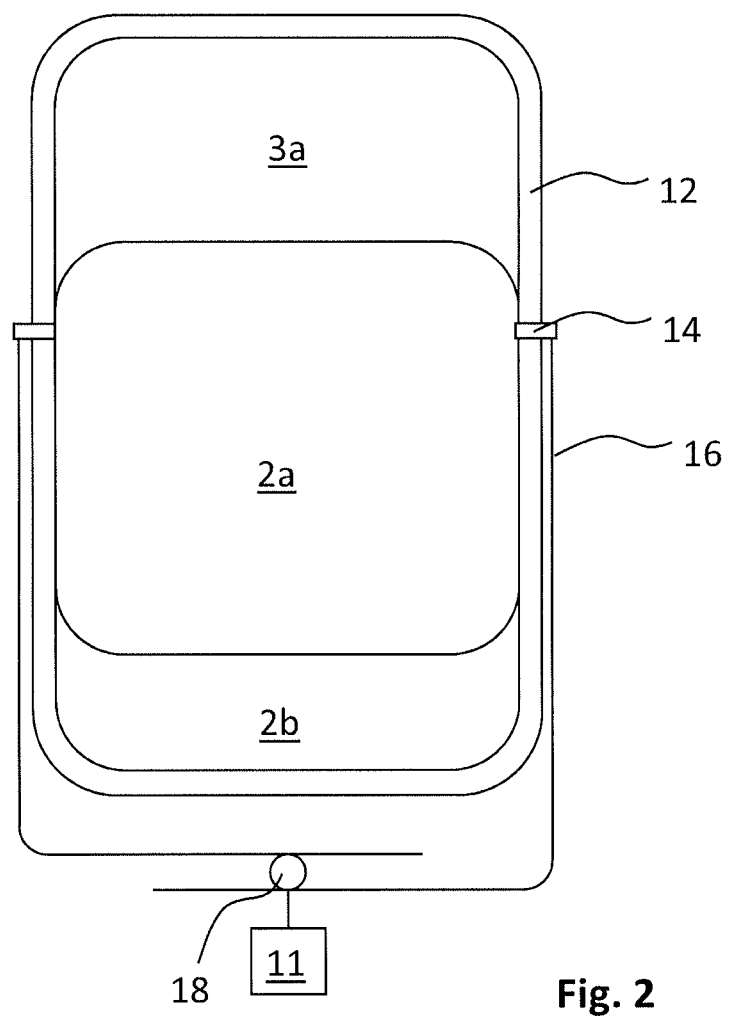
FIG. 2 shows a top view of an embodiment of an open roof assembly with a moveable closing member and a corresponding drive assembly.

FIG. 2 schematically illustrates an open roof assembly with a mechanical drive assembly. The open roof assembly comprises the moveable closure member 2a for closing the first roof opening 3a, the fixed panel 2b and a support frame 12. The support frame 12 is arranged and configured to mount and support the open roof assembly on a body frame of a vehicle. In FIG. 2, the moveable closure member 2a is schematically coupled to a drive cable 16 through a coupling element 14. In practice and as illustrated in FIGS. 1A and 1B, the moveable closure member 2a is arranged on the support frame 12 through the guide assemblies 6a, 6b and each guide assembly 6a, 6b is operated through an associated drive cable 16. In the illustrated embodiment, the drive cable 16 is moveable by the electric motor through an operative, mechanical coupling to a suitable gear wheel 18. The drive cable 16 and the gear wheel 18 are comprised in the mechanical drive assembly that operatively couples the electric motor 9 and the closure member 2a.

The gear wheel 18 is mechanically coupled to the electric motor 9, which is operatively coupled to the control unit 11. The control unit 11 may comprise electronic control circuitry, possibly comprising a computer processor. Further, the control unit 11 may be operatively coupled to one or more sensors. For example, a Hall sensor and usually two Hall sensors are arranged next to the electric motor 9 such that an alternating signal from the Hall sensors is received by the control unit 11 based on which the control unit 11 is enabled to derive a speed of the electric motor and an amount of displacement of the closure member. Other sensors may be provided and coupled to the control unit 11 as well. In particular, for use with the present invention as hereinbelow described in more detail, a voltage sensor for sensing a supply voltage of the electric motor and/or a current sensor for sensing an armature current of the electric motor may be suitably provided.

Figure 3A:
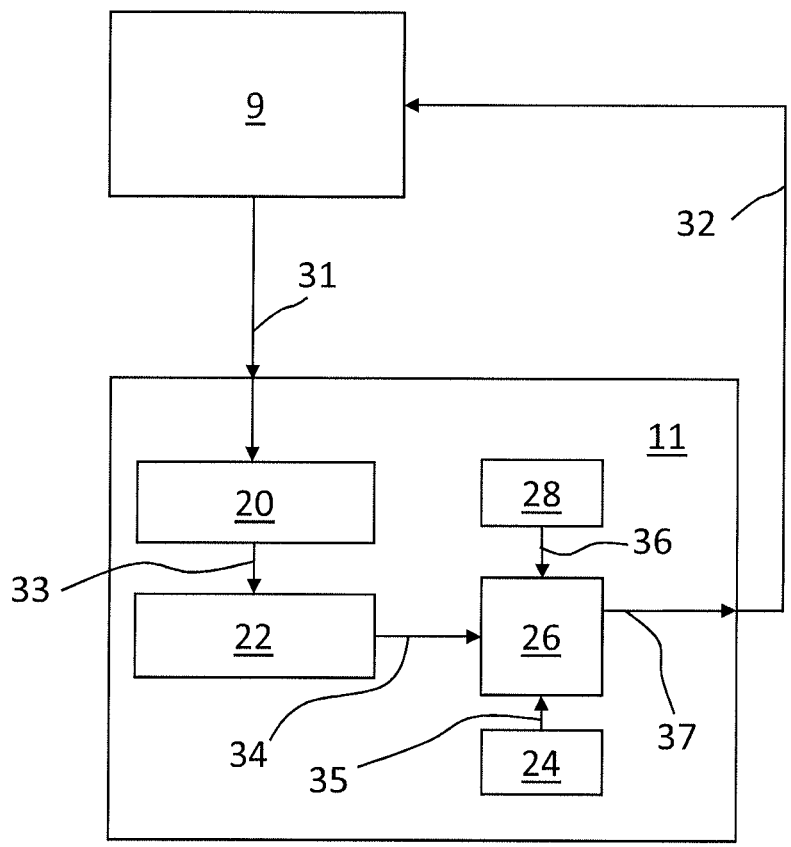
FIG. 3A shows a diagram of a first embodiment of a control unit for use in an open roof assembly.

Especially when closing the closure member 2a, but also when opening, an object may be pinched and become trapped e.g. between a leading edge of the closure member 2a and the support frame 12. To prevent damage to either of the object and the open roof assembly, the open roof assembly is usually provided with means to detect such a pinch and possible entrapment. Safety regulations may define requirements for such a detection means, in particular in respect of a maximum force generated on any trapped object. In general, to keep an exerted force as small as possible, it is preferred to detect a pinch with an object, even before it gets trapped, as soon as possible. On the other hand, with a high sensitivity, chances of such a pinch being falsely detected increase significantly. Therefore, in the prior art, a threshold for determining whether a pinch has occurred is set relatively high, due to which an actual pinch is detected with a delay, as a measureable effect due to the pinching first needs to increase above the detection threshold. FIG. 3A illustrates an embodiment of the control unit 11 configured to detect a pinch as soon as possible by enabling to lower the detection threshold without increasing the chance of a falsely detected pinch.

In FIG. 3A, the control unit 11 is operatively coupled to the electric motor 9. A sensor signal 31 is received from the electric motor 9 and a control signal 32 is sent to the electric motor 9. The sensor signal 31 may comprise a sensed value from one sensor or multiple sensed values from multiple respective sensors. For example, the above-described Hall signals may be comprised in the sensor signal 31. Further, the sensor signal may comprise one or more values of the supply voltage of the electric motor 9, an armature current and a motor speed. The control signal 32 may comprise a supply voltage for driving the electric motor 9 directly or may be merely a signal controlling an electric driver circuitry that is configured to supply the supply voltage to drive the electric motor 9.

In this first embodiment of the control unit 11, one or more of the above-mentioned sensed values are fed to a mathematical model module 20 as values of first drive system variables. The mathematical model module 20 uses the value of the first drive system variables to determine an update of model parameters as used in the mathematical model, e.g. stored in the mathematical model module.

The mathematical model as updated is then made available, e.g. by a model parameter signal 33 to a second drive system variables calculation module 22. Based on the model parameters, the mathematical model and the value of first drive system variables, the second drive system variables calculation module 22 calculates a value for one or more second drive system variables. The second drive system variable may be essentially any kind of drive system variable, but preferably the second drive system variable as used in the present invention relates to an effect that changes when the closure member pinches an object. Further, such a drive system variable is preferably constant over time and thus suitable for being compared to a previously detected and stored reference value.

For example, along a motion trajectory of the closure member, e.g. from an open position to a closed position, a mechanical resistance may vary e.g. due to an applied mechanism or presence of a wind deflector arm. As a result, a motor torque or force to be applied for normal motion may vary depending on a position of the closure member along the motion trajectory. However, such variations are constant and repeatable. Therefore, a motion reference field may be determined and stored, e.g. in a motion reference field storage 28. In order to perform a comparison, the second drive system variable should correspond to such a constant and repeatable variable of the drive system.

A value of the second drive system variable may be transferred to a comparison and determination module 26 as a second variable signal 34. The comparison and determination module 26 further receives the motion reference field from the motion reference field storage 28 as a reference value signal 36 and a value range from a value range storage 24 as a value range signal 35.

In the comparison and determination module 26, the value of the second drive system variable as received from the second drive system variables calculation module 22 is compared to a corresponding reference value received from the motion reference field storage 28. Such comparison may include a subtraction, for example, but may as well include any other suitable kind of operation leading to a comparison value. The comparison value may then be assessed in view of the value range. For example, if the comparison value lies within the value range, it may be determined that there is no pinch or entrapment. In another embodiment, as apparent to those skilled in the art, the value range may be configured to indicate that a pinch or entrapment has actually occurred.

If a pinch is detected the comparison and determination module 26 may be configured to output a pinch detection signal 37 indicating that the pinch has been detected and the control unit 11 is configured to initiate an immediate stop and preferably a reversal of the closure member through the control signal 32.

Figure 3B:
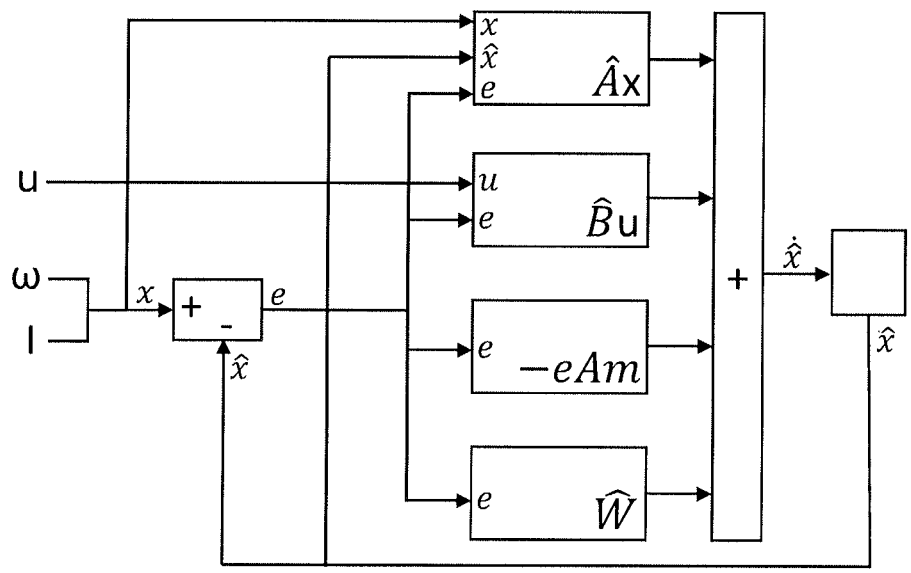
FIG. 3B shows a diagram of a mathematical motor model suitable for use in the present invention.

FIG. 3B illustrates a suitable mathematical model for use in the present invention such as in the mathematical model module 20 of the embodiment of FIG. 3A. This mathematical model is described in detail in EP3503333A1. Therefore, for a detailed description of the operation of this model, reference is made to paragraphs [0051]-[0067] and FIGS. 9-13 of EP3503333A1. It is noted that in this prior art disclosure, it is described to derive the occurrence of a pinch from a rapid change in the disturbance observer $\hat{W}$. In the present invention, the disturbance observer is merely a part of the mathematical model ensuring a correct and accurate operation of the model. The estimated motor model parameters are advantageously used to accurately determine an actual drive system variable. The motor model parameters are present in the matrices $\hat{A}$ and $\hat{B}$ as apparent from equations 157 and 158 in FIG. 12 of EP3503333A1, wherein the internal friction B and inertia J of the motor, armature resistance $R_a$ and inductance $L_a$ and motor constants $K_t$ and $K_e$ are incorporated. Based on the estimated values for these motor model parameters, an accurate determination of derivative drive system parameters may be obtained. For example, an accurate calculation of generated force or torque is obtainable, wherein the accuracy is not dependent on instant conditions, like e.g. temperature or wear over time. Effects of such conditions will be settled in the motor model parameters.

The mathematical model as illustrated in FIG. 3B uses the supply voltage u, the rotor speed $\omega$ and the armature current I as inputs. These inputs may be directly measured by suitable sensors or may be indirectly derived. For example, the armature current I may be derived from the supply voltage u and the rotor speed $\omega$ as described in EP3503333A1, in particular in relation to FIG. 13.

Figure 4:
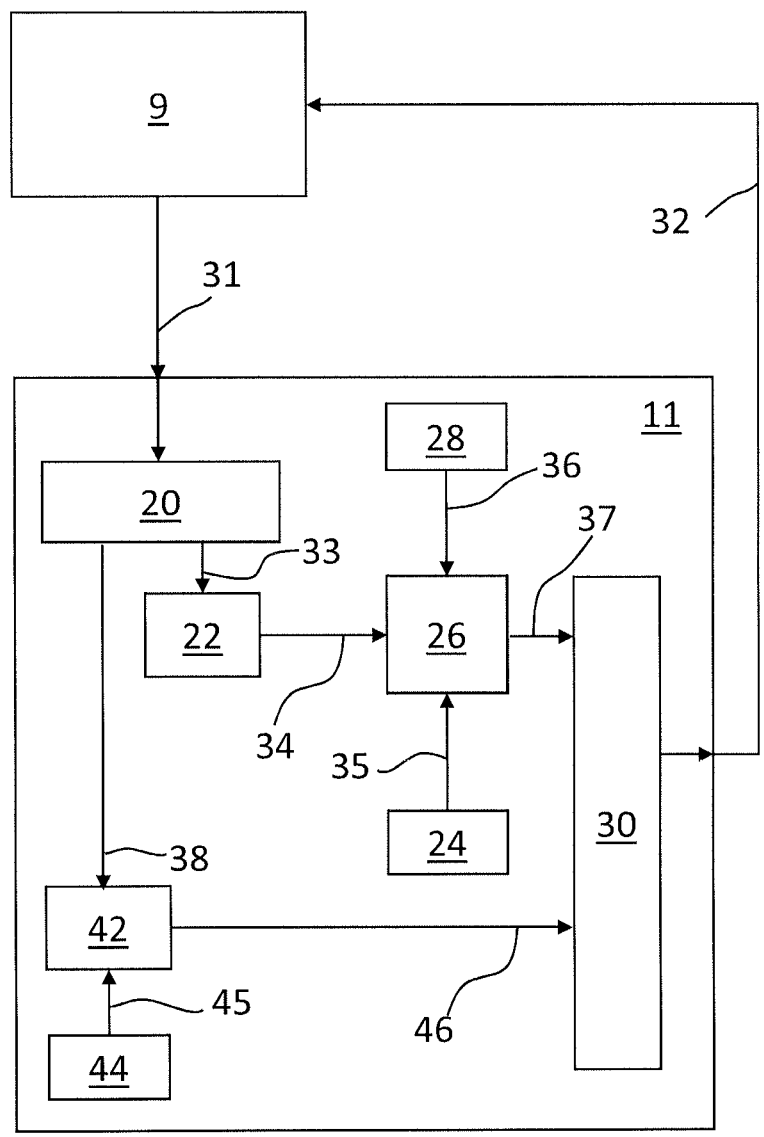
FIG. 4 shows a diagram of a second embodiment of a control unit for use in an open roof assembly.

FIG. 4 illustrates a second embodiment of a control unit 11 according to the present invention. The second embodiment corresponds to the first embodiment of FIG. 3A, but adds a second pinch detection system and method, wherein the system and method according to the present invention and the second pinch detection system may complement each other.

In the embodiment of FIG. 4A, the mathematical model module 20 and the second drive system variables calculation module 22 are provided and function as described in relation to FIG. 3A. The second drive system variables calculation module 22 outputs the second variable signal 34 to the comparison and determination module 26. Additionally, the mathematical model module 20 outputs a model signal 38, which is derived from the mathematical model. For example, the model signal 38 may correspond to the disturbance observer signal as described in EP3503333A1. A second determination module 42 receives the model signal 38 and assess the model signal 38 in view of an associated threshold or value range received as a second value range signal 45 from a second value range storage 44, e.g. in accordance with the method described in EP3503333A1. A second pinch detection signal 46, indicating whether a pinch is detected, is then supplied to a pinch detection evaluation module 30, which further receives the pinch detection signal 37 from the comparison and determination module 26. Based on the two pinch detection signals 37, 46 the pinch detection evaluation module 30 is configured to determine whether a pinch actually has occurred. For example, the pinch detection evaluation module 30 may determine that a pinch has actually occurred, if either one of the pinch detection signals 37, 46 indicates that a pinch has occurred. In another embodiment, both pinch detection signals may need to indicate the occurrence of a pinch for the pinch detection evaluation module 30 to determine the actual occurrence of a pinch. In a particular embodiment, the pinch detection signals 37, 46 may indicate a chance number indicating the chance that a pinch has occurred and the pinch detection evaluation module 30 evaluates both chance numbers to determine whether or not a pinch has occurred.

Figure 5:
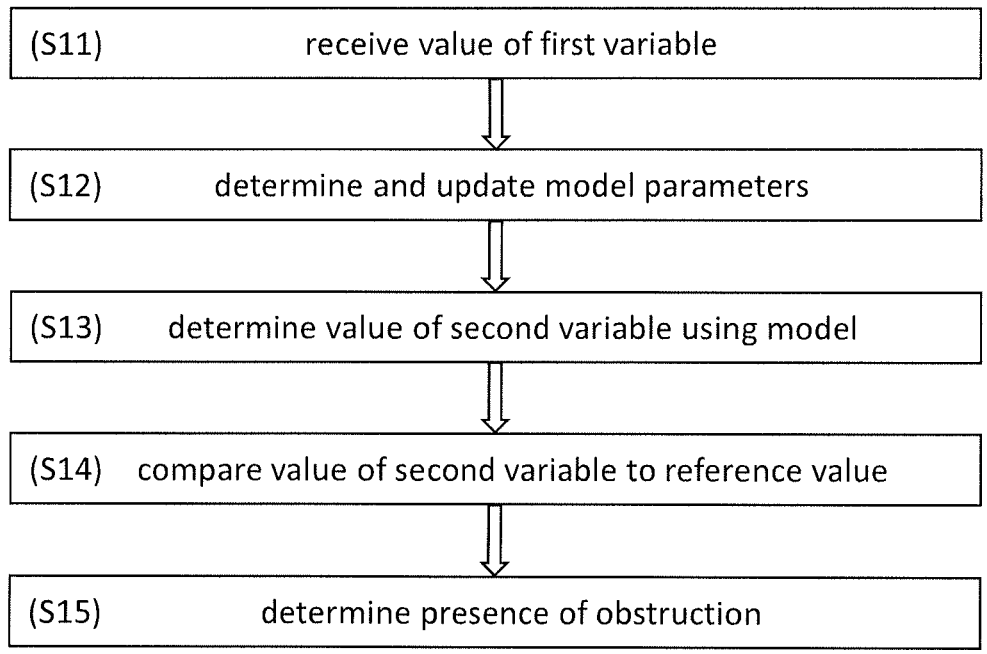
FIG. 5 shows a diagram of a first embodiment of a method.

FIG. 5 illustrates an embodiment of the method according to the present invention, wherein this embodiment of the method corresponds to the method performed in the embodiment of the control unit as presented in FIG. 3A.

In a first step S11 a value of a first drive system variable is received. Taking the mathematical model of FIG. 3B as an example, the first drive system variable may be the supply voltage u, the rotor speed $\omega$ or the armature current I, or any combination thereof. Based on such first drive system variables, model parameters of the mathematical model are re-determined and updated in a second step S12. Using the update model parameters, in a third step S13, a second drive system variable is determined using the mathematical model. It is noted that in another embodiment, the second step S12 and the third step S13 may be performed in an opposite order, although the accuracy of the second drive system variable may be slightly reduced, since the estimation is then based on model parameters corresponding to another position along the motion trajectory of the closure member. In yet another embodiment, the second step S12 and the third step S13 may be performed simultaneously, i.e. in parallel to thereby reduce the time needed for executing one iteration of the method. However, also in this embodiment, the accuracy of the second drive system variable may be slightly reduced, since the estimation is then based on model parameters corresponding to another position along the motion trajectory of the closure member.

Returning to the embodiment of FIG. 5, in a fourth step, the estimated second drive system variable is compared to a reference value of a motion reference field. In the fourth step S14, a comparison value is determined, which is used in a fifth step S15. In the fifth step S15, the comparison value is assessed in relation to a threshold or a predetermined value range in order to determine whether an obstruction is present, i.e. a pinch or entrapment has occurred.

Figure 6:
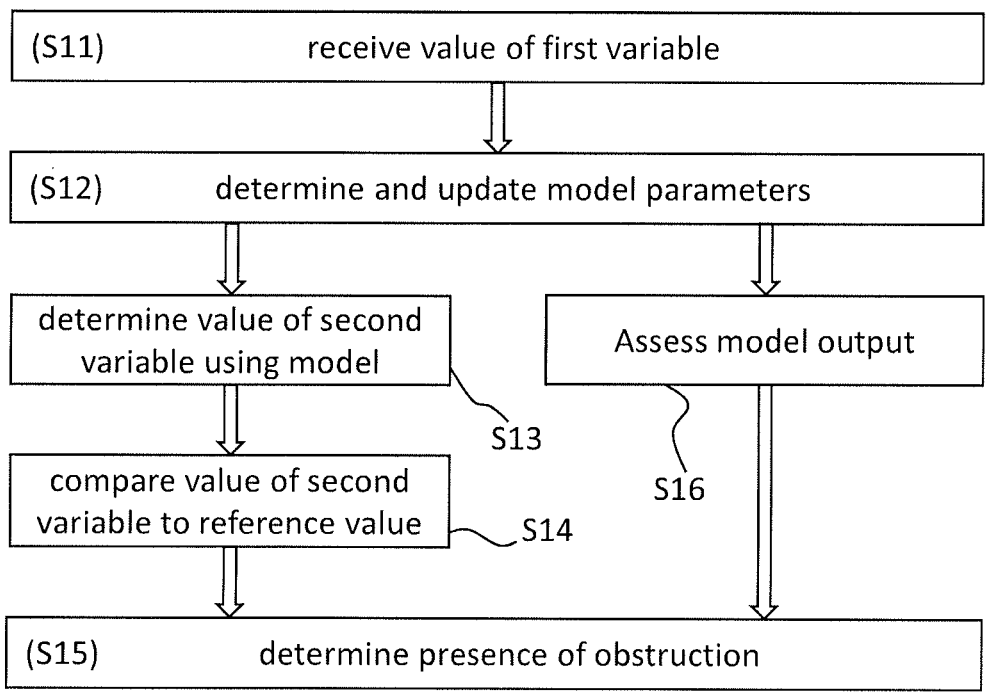
FIG. 6 shows a diagram of a second embodiment of a method.

FIG. 6 illustrates a second embodiment of the method corresponding to the method embodied in the control unit of FIG. 4. In this second embodiment, the method steps S11-

S15 are similar to the embodiment of the method as illustrated in FIG. 5. Compared to the embodiment of FIG. 5, the second embodiment adds a sixth step S16, which performs a second pinch detection based on a model output, e.g. a change in a disturbance observer signal. If the change in the disturbance observer signal exceeds a threshold, it is determined that there is a sudden change in conditions, which is assumed to be a pinching condition. In this embodiment, the fifth step S15 may comprise evaluating the outcome of both pinch detection methods in order to finally determine and decide whether a pinch has occurred or not.

In this embodiment, a single mathematical model is advantageously employed in two distinct pinch detection systems, thereby requiring low computational power, while providing a sophisticated and balanced pinch detection. In particular, sensitivity for different objects, e.g. hard objects and soft objects, may be optimized, if one system is more sensitive to a first kind of object, e.g. a hard object, and the other system is more sensitive to a second kind of object, e.g. a soft object.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly for use in a vehicle roof of a vehicle, the open roof assembly comprising a moveably arranged closure member for selectively covering or at least partially exposing an opening in the vehicle roof and a drive system operatively coupled to the closure member for moving the closure member along a motion trajectory,
   wherein the drive system comprises an electric motor and
      a control unit operatively coupled to the electric motor configured to control operation of the electric motor and for receiving a first drive system variable,
   wherein the control unit comprises
      a mathematical model describing at least a part of the drive system;
      model parameters as used in the mathematical model; and
      a motion reference field describing a reference value of a second drive system variable as a function of a position of the closure member along its motion trajectory; and
   wherein the control unit is configured to
      a. update the model parameters based on a received value of the first drive system variable;
      b. determine a value of the second drive system variable using the mathematical model;
      c. determine a comparison value by comparing the value of the second drive system variable and a corresponding reference value of the motion reference field; and
      d. detect presence of an obstruction when the comparison value lies outside a predetermined value range.

2. The open roof assembly according to claim 1, wherein steps a-d are repeated as long as the closure member is moving and no obstruction is detected.

3. The open roof assembly according to claim 1, wherein step a is performed prior to step b.

4. The open roof assembly according to claim 1, wherein step b is performed either prior to or simultaneous with step a.

5. The open roof assembly according to claim 1, wherein the control unit is configured to
   e. reverse a direction of motion of the closure member, when the obstruction is detected in step d.

6. The open roof assembly according to claim 1, wherein the mathematical model comprises a model of the electric motor.

7. The open roof assembly according to claim 1, wherein the mathematical model comprises a model of a motion of the closure member.

8. The open roof assembly according to claim 1, wherein the first drive system variable is selected from a group comprising a motor supply voltage, a motor current and a motor speed.

9. The open roof assembly according to claim 1, wherein the second drive system variable is selected from a group comprising a motor current, a closure member position, a generated force and a generated torque, or any derivative with respect to time thereof.

10. The open roof assembly according to claim 1, wherein the control unit is further configured to
   f. determine a presence of the obstruction based on a time-derivative of an output of the mathematical model.

11. A method of operating an open roof assembly, the open roof assembly comprising a moveably arranged closure member for selectively covering or at least partially exposing an opening in a vehicle roof and a drive system operatively coupled to the closure member for moving the closure member along a motion trajectory,
   wherein the drive system comprises an electric motor and
      a control unit operatively coupled to the electric motor for controlling operation of the electric motor and for receiving at least one first drive system variable,
   wherein the control unit comprises
      a mathematical model describing at least a part of the drive system;

model parameters as used in the mathematical model; and
a motion reference field describing a reference value of a second drive system variable as a function of a position of the closure member along its motion trajectory; and the method comprising the control unit performing steps of a. updating the model parameters based on the received at least one first drive system variable;
b. determining a value of the second drive system variable using the mathematical model;
c. determine a comparison value by comparing the value of the second drive system variable and a corresponding reference value of the motion reference field; and
d. detect presence of an obstruction when the comparison value lies outside a predetermined value range.

12. The method according to claim 9, wherein steps a-d are repeated as long as the closure member is moving and no obstruction is detected.

13. The method according to claim 9, wherein the method further comprises the control unit performing the step of
e. reversing a direction of motion of the closure member, when the obstruction is detected in step d.

14. A non-transitory computer readable medium containing computer readable and executable instructions for instructing a computer processor to perform a method of operating an open roof assembly, the open roof assembly comprising a moveably arranged closure member for selectively covering or at least partially exposing an opening in a vehicle roof and a drive system operatively coupled to the closure member for moving the closure member along a motion trajectory,
wherein the drive system comprises an electric motor and a control unit operatively coupled to the electric motor for controlling operation of the electric motor and for receiving at least one first drive system variable,
wherein the control unit or instructions comprises
a mathematical model describing at least a part of the drive system;
model parameters as used in the mathematical model; and
a motion reference field describing a reference value of a second drive system variable as a function of a position of the closure member along its motion trajectory; and the method comprising:

a. updating the model parameters based on the received at least one first drive system variable;
b. determining a value of the second drive system variable using the mathematical model;
c. determining a comparison value by comparing the value of the second drive system variable and a corresponding reference value of the motion reference field; and
d. detecting presence of an obstruction when the comparison value lies outside a predetermined value range.

15. The non-transitory computer readable medium according to claim 14, wherein steps a-d are repeated as long as the closure member is moving and no obstruction is detected.

16. The non-transitory computer readable medium according to claim 14, wherein the method further comprises
e. reversing a direction of motion of the closure member, when the obstruction is detected in step d.

\* \* \* \* \*